No. 878,858. PATENTED FEB. 11, 1908.
A. BILLOUEZ.
AUTOMATIC WATER LEVEL CONTROLLER FOR WATER SEPARATORS
OF GAS CONDUITS.
APPLICATION FILED MAY 4, 1907.
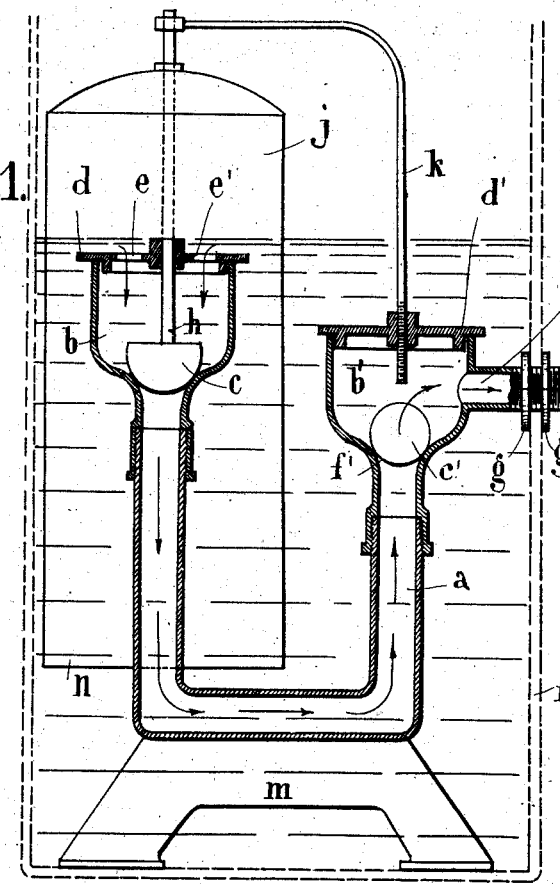
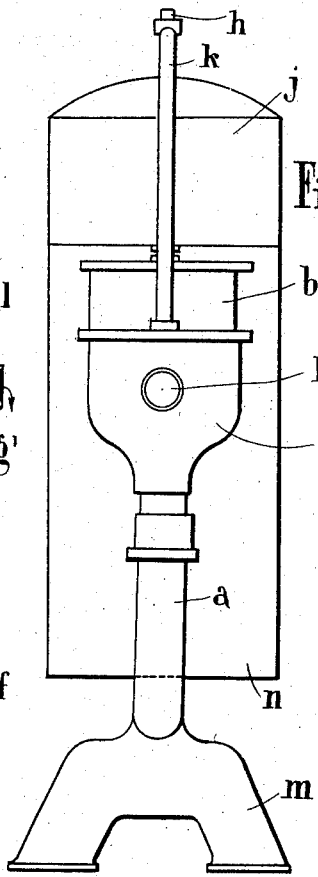
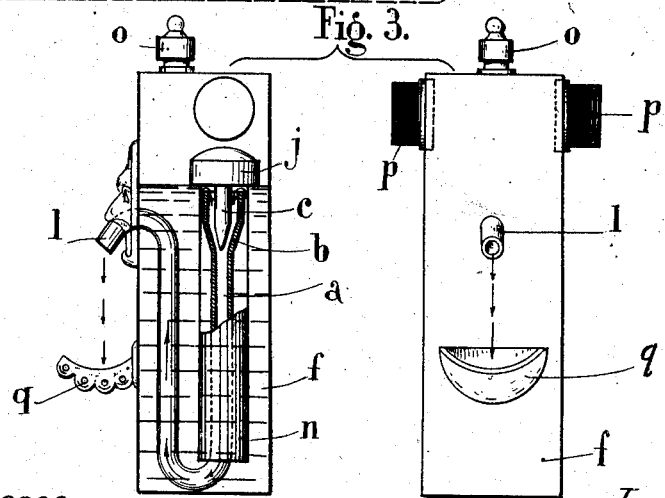
Witnesses:
Inventor,
Aubert Billouez.

UNITED STATES PATENT OFFICE.

AUBERT BILLOUEZ, OF ANDERLECHT, NEAR BRUSSELS, BELGIUM.

AUTOMATIC WATER-LEVEL CONTROLLER FOR WATER-SEPARATORS OF GAS-CONDUITS.

No. 878,858. Specification of Letters Patent. Patented Feb. 11, 1908.

Application filed May 4, 1907. Serial No. 371,815.

*To all whom it may concern:*

Be it known that I, AUBERT BILLOUEZ, a subject of the Belgian King, and residing at Anderlecht, near Brussels, Belgium, have invented new and useful Improvements in Automatic Water-Level Controllers for Water-Separators of Gas-Conduits; and I do hereby declare the following to be a full, clear, and exact description of the same.

My present invention relates to water level-controllers, and has for its object to provide an improved automatically operating device of this kind for water-separators of gas-conduits.

Broadly stated my invention comprises a U-shaped tube arranged within the water-receptacle and provided with two valve-boxes, containing suitable float and return-valves, said tube permitting a certain quantity of condensed water to be discharged from the receptacle, as soon as the water level is raised above the normal height.

In the accompanying drawing, I have shown two forms of construction of my invention.

Figure 1 shows the vertical longitudinal section, and Fig. 2 is the side elevation of an apparatus intended to be inserted into a large gas-conduit or main, the float being in its normal position. Fig. 3 shows sectional and side views of a similar device for smaller conduits in houses and the like the float being shown as elevated to permit the discharge of water from the device.

The device is formed of a U-shaped metal tube $a$ the upper ends of which are each provided with a hollow body $b$, $b'$ designed to contain valves $c$ $c'$. The cover $d$ secured on the casing $b$ is provided with openings $e$ $e'$. The casing $b'$ has a discharge-tube $l$, serving also to secure the device to the wall $f$ of the water-receptacle by means of two screw-nuts $g$ and $g'$. The valve $c$ contained in the casing $b$ carries a rod $h$ connected with a suitable float $j$, $n$. The valve $c'$ contained in the casing $b'$ is in the shape of a ball-valve. Secured to the center of the cover or lid $d'$ is a vertical rod serving both for guiding the rod $h$ and limiting the upward movement of the valve $c'$. The cover $d'$ is not perforated but plain and held on the casing $b'$ by friction.

The complete device is secured on a suitable base $m$, placed freely upon the bottom of the well known receptacle $f$ inserted into the gas-conduit for collecting condensed water. In order to secure the device in place, the wall of the receptacle is provided with a lateral opening through which extends the discharge-tube $l$, held in place by the nuts $g$ $g'$ already referred to.

The operation is as follows:—As the water condensed within the collector $f$ rises above the normal level, the float $j$ rises with it, thereby raising the valve $c$ and the excess of water flows through the perforations $e$, $e'$ into the casing $b$ and thence downwards and upwards through the U-shaped tube $a$ (see arrows Fig. 1), until said water raises the valve $c'$ and is discharged through the tube $l$ into the surrounding ground. As soon as the water level is again lowered, the float $j$ brings the valve $c$ back upon its seat. The ball-valve acting as return-valve serves to prevent water from the surrounding ground from entering the collector.

For application to smaller house gas-conduits the device comprises an air and gas-tight vessel $f$ containing the U-shaped tube $a$. The straight branch of the latter carries a small hollow body $b$ containing the valve $c$ connected with a float $j$ provided with a tubular extension $n$. The second branch of the tube $a$ is bent laterally through the wall of the vessel $f$. The latter is provided, at the top, with an opening closed by a plug $o$ and permitting water to be poured into the vessel, and also with two screw-threaded tubular extensions $p$, by means of which it may be easily and readily inserted into a gas-conduit.

When the normal level is obtained by pouring water into the vessel and the plug $o$ tightly secured in place, the device will operate as follows:—The water condensed in the gas-pipe arrives into the vessel $f$ and raises the float $j$ and also the valve $c$ so that the excess of water escapes through the tube $a$ (see arrows Fig. 3), and is discharged into the cup $q$. When the normal level is again obtained, the float $j$ will close the valve $c$ so that no more water can escape.

Having fully described my invention, what I claim and desire to secure by Letters Patent is:—

1. A device for automatically controlling the water level in water separators of gas conduits comprising a casing, a U-shaped tube vertically arranged within the same, valves at each end of said tube, and a float within said casing and connected to one of said valves.

2. A device for automatically controlling the water level in water separators of gas conduits comprising a casing, a U-shaped tube vertically arranged within the same, valves at each end of said tube, one valve being higher than the other, and a float within said casing and connected to one of said valves.

In testimony whereof, I have signed my name to this specification in the presence of two subscribing witnesses.

AUBERT BILLOUEZ.

Witnesses:
CHARLES HONOLD,
PAUL MAPHY.